United States Patent [19]

Lefevre

[11] Patent Number: 5,136,532
[45] Date of Patent: Aug. 4, 1992

[54] COHERENT SIGNAL PROCESSING DEVICE USING AN OPTICAL DELAY LINE AND APPLICATION THEREOF TO FILTERING CORRELATION PRODUCT AND SPECTRAL ANALYSIS

[75] Inventor: Hervé Lefevre, Paris, France
[73] Assignee: Thomson-CSF, Paris, France
[21] Appl. No.: 584,444
[22] Filed: Sep. 17, 1990

Related U.S. Application Data

[63] Continuation of Ser. No. 173,293, Mar. 25, 1988, abandoned.

[30] Foreign Application Priority Data

Apr. 3, 1987 [FR] France ............................ 8704725

[51] Int. Cl.[5] .................. G06E 3/00; G06G 7/16; G06G 7/19
[52] U.S. Cl. ...................... 364/807; 356/345; 364/822; 364/827; 364/841
[58] Field of Search .............. 364/807, 822, 841, 827; 350/96.11; 356/345, 349, 350; 324/96

[56] References Cited

U.S. PATENT DOCUMENTS

| | | | |
|---|---|---|---|
| 4,265,541 | 5/1981 | Leclerc et al. | 356/350 |
| 4,370,612 | 1/1983 | Puech et al. | 324/117 R |
| 4,662,751 | 5/1987 | Goss et al. | 356/350 |

OTHER PUBLICATIONS

IEEE Transactions on Microwave Theory and Techniques, vol. MTT-33 No. 3, Mar. 1985, pp. 193–210, New York, US; K. P. Jackson et al, "Optical fiber delay-line signal processing".

Journal of Lightwave Technology, vol. LT-4, No. 7, Jul. 1986 pp. 852–857, IEEE, New York, US; W. A. Stallard et al.: "Integrated optic devices for coherent transmission".

Patent Abstracts of Japan, vol. 9, No. 58, (P-341)[1781], Mar. 14, 1985; & JP-A-59 195 220, (Masayuki Izutsu), Jun. 11, 1984.

Arditty, H. et al., "Current sensor using state-of-the-art fiber-optic interferometric techniques", *IOOC'81:Third Int'l. Conf. on Integrated Optics and Optical Fiber Communications, San Francisco, CA, USA, Apr. 27-29, 1981, pp. 128-130.*

Bulmer, C., et al., "Fiber gyroscope with . . . LiNbO3 phase shifter", *Optics Letters*, vol. 6, No. 11, Nov. 1981, pp. 572–574.

Heismann, F., et al., "Integrated-optical frequency translator with strip waveguide", *Appl. Phys. Lett.* vol. 45, No. 1, Sep. 1984, pp. 490–492.

*Primary Examiner*—Stephen M. Baker
*Attorney, Agent, or Firm*—Oblon, Spivak, McClelland, Maier & Neustadt

[57] ABSTRACT

A coherent signal processing device is provided using a monomode optical fiber as delay line, comprising a source and a ring interferometer with a bidirectional coupler and a monomode optical fiber loop whose ends are coupled to two combined accesses of the coupler. The source is connected to one of the opposite accesses and a detector is connected to the last access. For processing, a series of electrooptical phase modulators, separated by identical fiber lengths corresponding to a given delay, are controlled simultaneously by an electric pulse signal. The processing is coherent for it results from the interferences between two optical waves following opposite paths.

7 Claims, 3 Drawing Sheets

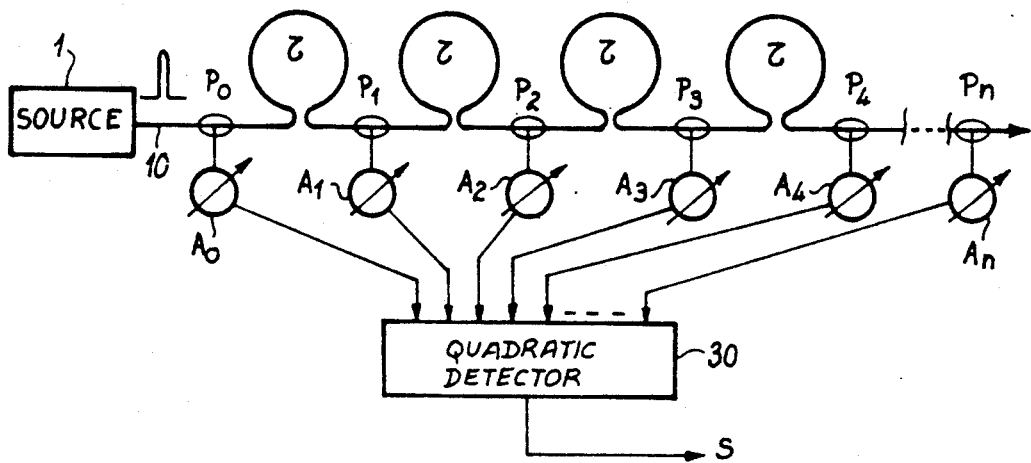
PRIOR ART FIG_1
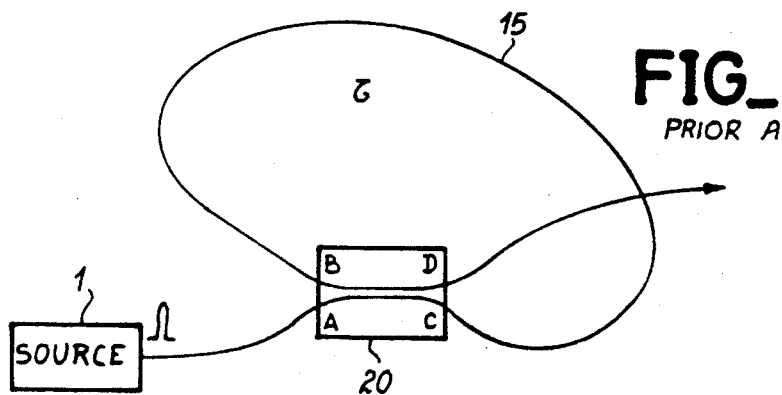
FIG_2
PRIOR ART
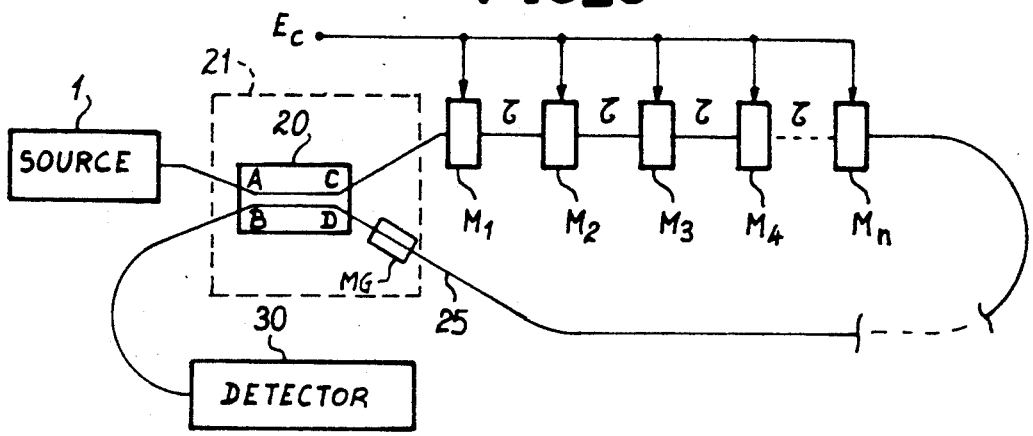
FIG_3

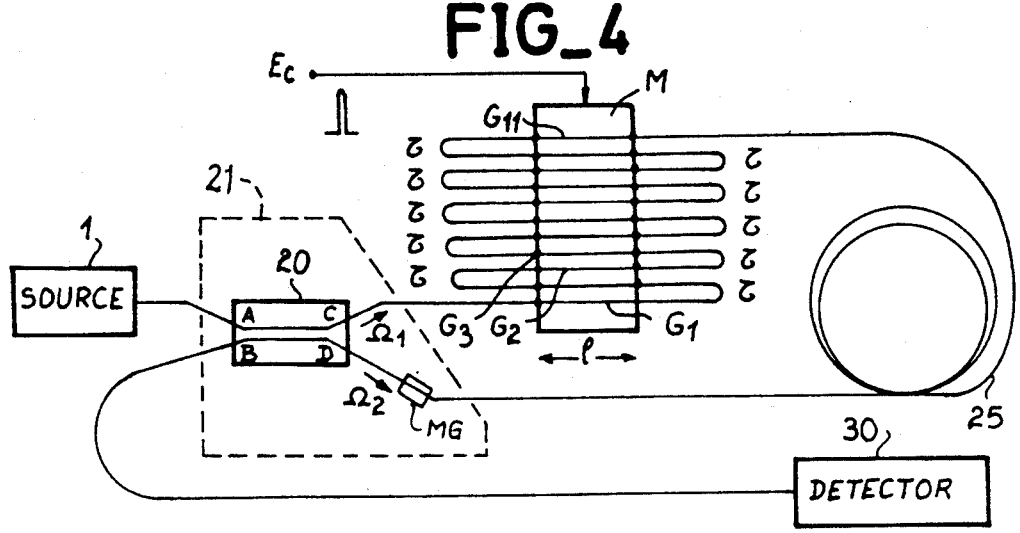
FIG_4
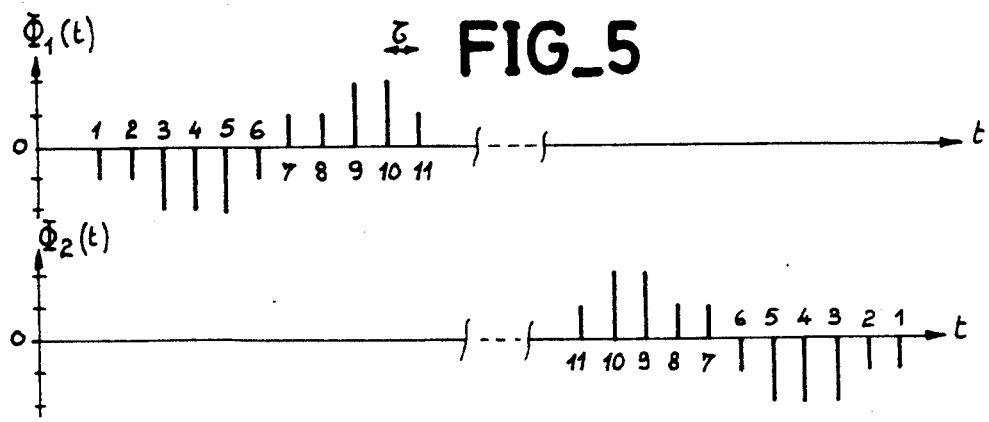
FIG_5
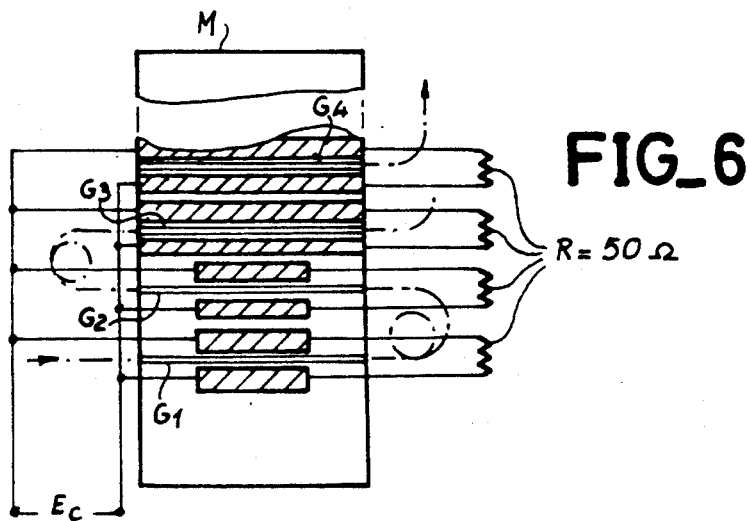
FIG_6

FIG_7
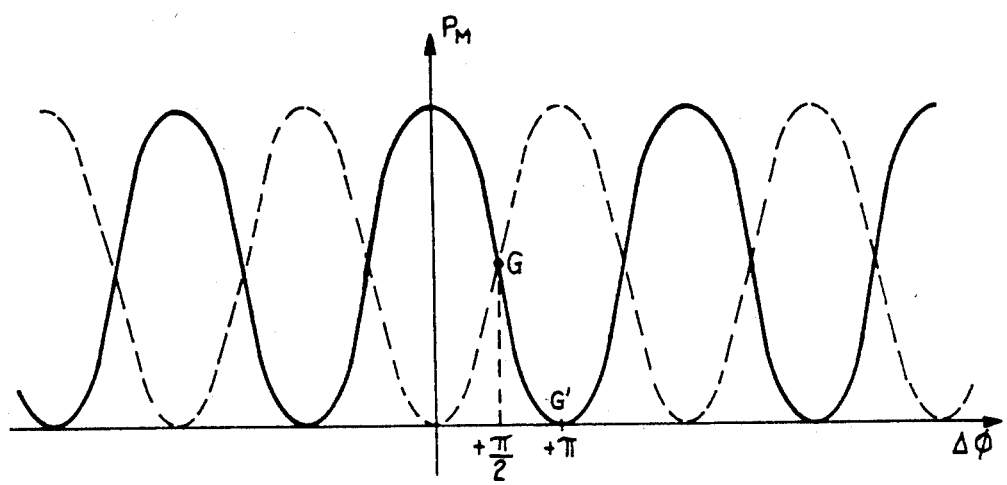
FIG_8
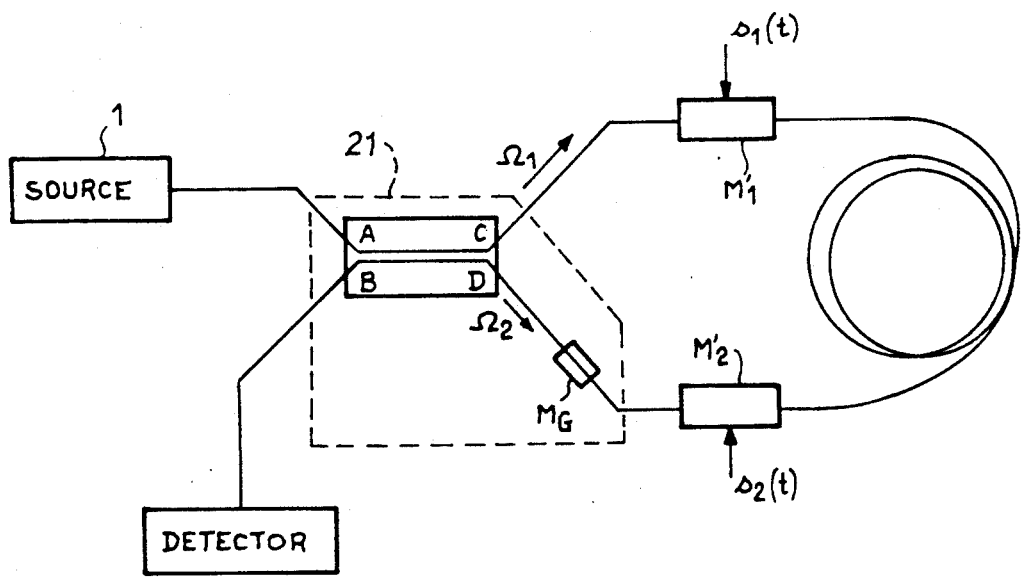

COHERENT SIGNAL PROCESSING DEVICE USING AN OPTICAL DELAY LINE AND APPLICATION THEREOF TO FILTERING CORRELATION PRODUCT AND SPECTRAL ANALYSIS

This application is a continuation of application Ser. No. 07/173,292, filed on Mar. 25, 1988, now abandoned.

BACKGROUND OF THE INVENTION

1. Field of the Invention

The invention relates to the field of signal processing, and more particularly to processing using optical waves. The use of optical waves for transmitting information through optical wave guides, in particular through optical fibers, has multiple advantages particularly because of the very low sensitivity to disturbances of this type of guide. Beyond the simple transmission aspects, a number of applications of this optical signal transmission have revealed interesting properties which will lead to the use of these optical guides also for processing the information transmitted over these guides.

In particular, the use of monomode optical fibers as delay lines is advantageous in particular for processing wide band hyperfrequency signals. In fact, the dispersion performances of optical fibers, more than 100 GHz per km and attenuation, less than 0.5 dB per km, make it possible to envisage passband—delay products greater than $5 \times 10^5$ with delays of the order of several tens of microseconds.

2. Description of the Prior Art

The performances of monomode fibers for guiding are fully exploitable because of the fact that light sources and adapted III/V semiconductor detectors have been perfected, as well as integrated optical circuits producing the useful functions, for example coupling or modulation.

The applicant company has moreover already described in the information bulletin of its research laboratory, in December 1986, the construction of a 5 GHz band delay line with 5 microseconds delay.

Because of these great possibilities, the use of monomode optical fibers as delay lines for processing has already been envisaged more particularly in an article entitled "Optical fiber delay line signal processing" in the IEEE Transaction on Microwave Theory and Techniques, vol. MTT 33, n° 3, March 1985. This article describes more particularly tapped lines and recirculation lines in which the optical fiber or loops thereof are used for introducing delays in the transmitted signal. The delay lines thus formed combine incoherently the signals from the different tappings provided for this purpose along the delay line.

In theory, the optical carrier could be used for coherent processing, but in this case the relative phases of the optical carrier at each of the signal tappings should be stable up to a fraction of the optical wave length. That would require a narrow and very stable source spectrum; in addition, the optical path differences should also be constant up to a fraction of the wave length. For this reason coherent detection, which depends on the phase of the optical carrier, is not used in devices employing monomode fiber delay lines.

Only the incoherent summation by quadratic detectors is possible and negative weighting, if required, of the signals from the different tappings on a monomode optical fiber delay line, for providing filtering functions, cannot be accomplished optically.

SUMMARY OF THE INVENTION

The invention provides a signal processing device with optical delay line, which allows coherent processing of the transmitted signal and which therefore avoids the drawbacks of systems in which only quadratic detection is possible, and opens up great possibilities of application.

According to the invention, in a signal processing device using a monomode optical fiber as delay line, in order to carry out coherent processing the device includes a ring interferometer whose ring is the monomode optical fiber, the two ends of the fiber being coupled to two accesses of a bidirectional coupler, to another access of which a source is coupled a source for delivering a continuous optical wave, the two contrarotating optical waves in the ring being combined at the output in the coupler so as to form interferences analyzed by a detector coupled to the fourth access of the coupler, an electrooptic phase modulator placed at one end of the fiber introducing a pre-established phase shift at the rate of the travel time in the fiber for fixing the operating point on the sinusoidal response of the interferometer as a function of the phase shift, the processing device further including phase modulators controlled by the signals to be processed placed on the fiber.

In a first embodiment adapted more particularly for filtering, a series of phase modulators are spaced evenly apart along the fiber and are controlled by the same signal for carrying out filtering functions, the interferometer being placed at an operating point where its characteristic is linear.

In another embodiment, two phase modulators are disposed close to the two ends of the fiber and are controlled by different signals whose product it is desired to obtain, the interferometer being placed at an operating point where its characteristic is quadratic, so as to provide correlation functions or spectral analysis.

BRIEF DESCRIPTION OF THE DRAWINGS

The invention will be understood and other characteristics will be clear from the following description with reference to the accompanying FIGS.

FIG. 1 a tapped delay line using an optical fiber, of the prior art;

FIG. 2 is a recirculation line using an optical fiber, of the prior art;

FIG. 3 is a processing device of the invention in a first embodiment;

FIG. 4 is a second embodiment of the processing device using an optical fiber delay line in accordance with the invention; and FIG. 5 is a diagram of explanatory signals.

FIG. 6 shows one embodiment of a modulator M;

FIG. 7 shows the sinusoidal response of the interferometer;

FIG. 8 shows a third embodiment of the processing device of the invention.

DESCRIPTION OF THE PREFERRED EMBODIMENTS

The signal processing device using a tapped optical fiber delay line of the prior art, includes a source 1 which emits an optical wave pulse to which is coupled a monomode optical fiber 10 along which a number of equidistant tappings $P_0, P_1, P_2, \ldots P_n$ are spaced apart, the delay introduced between two consecutive tappings, $P_i$ and $P_{i+1}$ being equal to $\tau$; the signals from these different tappings are transmitted by attenuators respectively $A_0, A_1, A_2, \ldots A_n$ to the inputs of a quadratic detector 30. The output signal of this quadratic detector is then the sum, weighted by the attenuators $A_0, \ldots A_n$, of the signals from the different tappings $P_0, \ldots P_n$ successively delayed by $\tau$.

As mentioned above, the defect of such a processing device is that it can only process positive signals, possibly by weighting them, because of the type of detection which can be used. Consequently, the weighting by negative coefficients is excluded for this type of system, unless expedients are used by which the outputs of the different tappings are combined in one or other of two detectors depending on whether a positive or negative coefficient is to be assigned thereto, the outputs of these two detectors being then combined with different signs.

FIG. 2 shows an optical fiber delay line, called recirculation line, of the prior art. This structure includes a source 1 which emits an optical wave pulse, an optical fiber loop 15 and a directional coupler 20 arranged in the following way: source 1 is connected to the first access A of the coupler, the optical fiber loop is connected between an opposite access C of the coupler and the combined access of A, B, and the output of the device is provided at the second opposite access D. Thus, at the first passage, a fraction of the optical wave is transmitted to the output D whereas the other fraction travels through loop 15. On the second passage, a fraction of the optical wave is transmitted to the output D and the other part recirculates in loop 15, etc.. Thus, between the output pulses, strictly equal delays are obtained since the optical path is the same.

Like the device shown in FIG. 1, that shown in FIG. 2 does not allow coherent processing of the signal.

FIG. 3 shows a first embodiment of the signal processing device of the invention. This device includes a source 1 for emitting a continuous optical wave, connected to a first access A of a bidirectional coupler 20 (integrated optics or fiber for example). At the two opposite accesses C and D of the directional coupler 20 are connected both ends of a monomode optical fiber loop 25 at one end of which electrooptical modulators $M_1, M_2$, etc... $M_n$ are mounted in series along the optical fiber; two successive modulators $M_i, M_{i+1}$ are connected by optical fiber portions of identical lengths introducing a delay equal to $\tau_{1,i+1}$. These modulators are controlled by a pulsed electric control signal applied to the input $E_C$. A phase modulator $M_G$, controlled by a signal whose period is equal to the propagation time in the fiber, is placed on the fiber at the other end for introducing a fixed phase shift between the two contrarotating waves circulating in the fiber, fixing the operating point. A detector 30 is connected to the fourth access B of the coupler 20. This structure is that of a ring interferometer, in the ring of which are placed several integrated optical phase modulators in series, separated delays $\tau_{i,i+1}$. In the following all the delays are supposed equal to $\tau$. Typically $\tau$ equal 5 nanoseconds for a meter of optical fiber. These modulators, controlled by the same pulsed control signal, will introduce pulsed phase shifts spaced apart by $\tau$ in the continuous signal transmitted in the loop. When the signals pass again over the bidirectional coupler where the waves interfere, the phase shifts will be added or subtracted in the quadratic detector within the limit of the linearity zone of the sinusoidal response of the interferometer fixed by the modulator $M_G$. With respect to the prior system comprising a tapped line of the type shown in FIG. 1, the processing possibilities are much greater.

FIG. 4 shows a particular embodiment of the coherent signal processing device of the invention. It includes as before a source 1, a bidirectional coupler 20, a monomode optical fiber coil 25 at one end of which elementary modulators are placed in series along the optical fiber and at the other end of which the modulator $M_G$ is placed. But in this embodiment the modulators are all constructed on the same circuit M. This circuit is an integrated optical circuit of width $l = 10$ to 20 mm, depending on the desired phase modulator, and at the surface of which optical guides $G_1, G_2, \ldots G_n$ are provided, $n = 11$ in the FIG. with control electrodes disposed conventionally on each side of the guide, and not shown in the FIG., for introducing a phase shift because of the electric field applied to the guides. Optical fiber portions of length adapted to the delay $\tau$ to be introduced between two phase modulators connect the output of one guide to the input of the next, for example in the configuration shown in FIG. 4, where the output of a modulator and the input of the next modulator are formed on the same lateral face of the integrated optical circuit. This arrangement is not limitative and all the inputs of the modulators may be disposed in the same lateral face of the integrated optical circuit and all the outputs on the other face, of the optical fiber loops being correspondingly adapted. As before, the access to the bidirectional couplers situated on the same side as the source is connected to a detector 30.

The electric signal applied to the control input $E_C$ is an electric pulse which introduces a phase modulation of the optical wave simultaneously in the light wave propagating in the optical figure, and so at times spaced apart by $\tau$ in the continuous optical wave transmitted by the source. The length of the electrodes of each of the elementary modulators, which are formed independently or on the same integrated optical circuit, determines the phase shift applied and the direction of this phase shift is fixed by the direction of the electric field applied to these electrodes. By a special configuration of the electrodes, it is therefore possible to obtain phase shifts $\phi_{1(t)}$ and $\phi_{2(t)}$ in the two contrarotating waves $\Omega_1$ and $\Omega_2$ in the fiber loop 25. An example of these phase shifts is shown in FIG. 5; the wave $\Omega_1$ is first of all subjected to modulation by the modulator formed from guide $G_1$ whereas the contrarotating wave $\Omega_2$ is first of all subjected to a phase shift by the modulator formed from guide $G_{11}$. The modulation may be analog or by quanta, i.e. the phase shifts may be of any sort provided that they remain in the linear part of the power characteristic of the output signal resulting from the interferences as a function of the phase, whose variation is sinusoidal as a function of the phase difference between the two waves when the interferometer is placed obliquely.

$$P(\Delta\phi) = P_M(1 + \sin \Delta\phi) \text{ and } \Delta\phi = \phi_1 - \phi_2$$

where $P_M$ is the maximum output power.

FIG. 6 partially shows one embodiment of the modulator M where the control electrodes of the phase modulators have been shown, assuming that the phase shifts applied are those shown in FIG. 5.

For constructing the modulators, a few precautions must be taken so that the parasitic capacity introduced by the control electrodes of the modulator does not limit the pass band. For that, the configuration the best adapted is that shown in FIG. 6, where the electric field is applied to both ends of the electrodes, in the propagation direction of the optical wave, the other two ends being loaded by a load resistor R=50 ohms so as to form a matched line. Each guide $G_1$, $G_2$, $G_3$, $G_4$ is associated with suitably shaped control electrodes. In the example shown the control voltage has the same direction for the first four modulators.

The invention is not limited to the embodiments described and shown. In particular, in the embodiment shown in FIG. 3, it is possible to provide weighting by applying weighting to the control signal of the different modulators by means of attenuators attenuating the electric pulsed control signal.

It is also possible to carry out processing with different control signals applied to the different modulators $M_1$, $M_2$...

In the embodiments of the signal processing device using a delay line as described above, the linear part of the sinusoidal response of the interferometer shown in FIG. 7 is used for detecting phase differences. For that, the interferometer is placed "obliquely" in the linear zone, i.e. a phase modulator $M_G$ placed at one end of the fiber creates an additional phase modulation alternately of $+\pi/4$ and $-\pi/4$, at the rate of the travel time in the fiber and so an additional phase shift equal to $\pi/2$ which places the operating point of the interferometer at point G of the sinusoidal response, FIG. 7, the phase variations resulting in power variations about this point.

It is also possible to use the non linear part of the sinusoidal response of the interferometer for detecting signals whose processing was carried out at a high frequency, for example about 10 GHz, in a lower frequency band, 10 to 100 MHz, for example. Such processing using the quadratic part of the response of the interferometer as a function of the phase is applied for example to the provision of functions such as intercorrelation, self-correlation or spectral analysis.

In fact, it was pointed out in the above example that the phase modulators spaced apart along the fiber were controlled by the same signal. But these modulators, and more particularly two modulators placed at both ends of the optical fiber, may be controlled by different signals, $s_1(t)$ and $s_2(t)$. FIG. 8 illustrates one embodiment of the processing device of the invention: a source 1 is connected to the first access A of a 3dB coupler 20 which distributes the incident optical wave between the two ends of an optical fiber loop 25, themselves coupled to accesses C and D of coupler 20. Two phase modulators $M'_1$ and $M'_2$ controlled by electric signals respectively $s_1(t)$ and $s_2(t)$ create phase modulations respectively $\rho_1(t)$ and $\rho_2(t)$. When an additional modulation is applied, such as in the absence of signals $s_1(t)$ and $s_2(t)$ the phase difference between the two contrarotating waves is $\pi$, i.e. the operating point on the characteristic of FIG. 7 is G', the light intensity on detector 30 coupled to the fourth access B of coupler 20 is a function of the product $$\rho_1(t) \cdot \rho_2(t)$$

Consequently, if the detection is carried out in a low pass band (for example 100 MHz) and if the signals $s_1(t)$ and $s_2(t)$ are at a high frequency (for example 10 GHz), the intensity detected is a function of $$\int_{td} \rho_1(t)\rho_2(t)dt$$

where td is the response time of the detector.

This structure makes low band detection (B=1/tb) possible for signals whose processing is carried out at a higher frequency, 10 GHz for example. Such low band detection makes it possible to limit the noise at the level of the detector photodiode.

So that the phase shift of the output of the interferometer only depends on $s_1(t-\tau_1)$ and $s_2(t-\tau_2)$, where $\tau_1$ is the propagation time between the access C and the modulator $M'_1$ and where $\tau_2$ is the propagation time between the access D and the modulator $M'_2$, the optical fiber 25, between $M'_1$ and $M'_2$ may be a high dispersion fiber so that the information applied via $s_1(t)$ on the wave passing through the fiber in the "−" direction is filtered, and similarly for the information applied via $s_2(t)$ on the wave passing through the the fiber in "+" direction.

It is also possible to add another high dispersion element in the loop.

Finally, in order to improve the signal/noise ratio, the optical wave may be amplified by any known means. Such amplification, in the loop, or even downstream, may for example be achieved by stimulated "RAMAN" effect (by transfer of energy from a pump signal to the optical wave), by semiconductor optical amplification or else by wave coupling.

For application to spectral analysis:

$s_1(t)=s(t)$, signal to be analysed $s_2(t)=\cos \Omega t$ (or sine $\Omega t$)

where $\Omega=2\pi(f+f't)$, for a ramp frequency modulation, the signal at the output of the detector is of the form:

$$S(t) = S_o - \int_\tau s(t)\cos\omega t\, dt$$

This signal is therefore directly related to the Fourier transform of s(t):

$$\int_\tau s(t)\cos(\omega t)dt$$

It is possible to obtain the real part or the imaginary part of the Fourier transform by using two similar circuits.

The orders of size may be the following, with existing technologies:
F=5 to 15 GHz
R the resolution
T the scanning time: $T \simeq \Delta F/R^2$
SNR: signal to noise ratio, 1° if the power available at the detector is of the order of 1μW, R=100 MHz, T=1μs and SNR=30 if we remain in the quadratic part of the response of the interferometer, at better than 2%.

2° if the power available at the detector is of the order of 10 μW, E=10 MHz and SNR≈300, still remaining in the quadratic part of the response of the interferometer, at better than 2%.

When the scanning time T is greater than the duration of the signal to be analysed, the structure shown in FIG.

3 including several modulators controlled by the same signal namely s(t). may be combined with the structure shown in FIG. 8 to allow the signal to be repeated at a timing equal to the propagation time between modulators a number of times equal to the number of modulators: for that the modulator $M'_1$ receiving s(t) is replaced by a succession of modulators all receiving the signal s(t), and an other modulator receiving $\cos(\omega t)$, with $\omega = \pi(f+f't)$.

The modulator $M_G$ shown on FIGS. 3, 4 and 8 can be integrated with the bidirectional coupler 20, such forming a multifunction integrated optical circuit, shown as 21 in these figures.

What is claimed is:

1. A signal processing device for carrying out coherent processing comprising:
   a ring interferometer having a ring made of a monomode optical fiber acting as a delay line;
   a bidirectional coupler, the two ends of the fiber being coupled to two accesses of said coupler;
   a source for delivering a continuous optical wave, said source being coupled to a third access of said bidirectional coupler;
   a detector coupled to the fourth access of the coupler for analyzing interferences formed at the output of the coupler by two contrarotating optical waves in the ring;
   a first electro-optical phase modulator placed at one end of the fiber for introducing a pre-established phase shift at the rate of the travel time in the fiber for fixing the operating point on the sinusoidal response of the interferometer as a function of the phase shift; and
   a plurality of further phase modulators disposed in series on the fiber, the output of one phase modulator being connected to the input of the next phase modulator by a monomode optical fiber portion of predetermined length for introducing a given delay, the further modulators being controlled simultaneously by a pulse control signal, the interferometer being placed at an operating point about which its characteristic is linear.

2. A signal processing device according to claim 1, wherein the length of the optical fiber loop between the last of said further phase modulators and a corresponding one of said two accesses of the coupler is such that the propagation time there is at least equal to the propagation time between the other of said two accesses of the coupler and the said last modulator, the successions of phase modulations pulses resulting from the modulations applied to the contrarotating waves then being separated in time and detectable independently by the detector.

3. A signal processing device according to claim 1, wherein the modulator introducing a preestablished phase shift is integrated with the bidirectional coupler in a multifunction integrated optical circuit.

4. A signal processing device according to claim 1, wherein the processing comprises filtering signals.

5. A signal processing device according to claim 1, wherein said further phase modulators are formed on an integrated optical circuit which has as many separate waveguides as there are modulators, control electrodes being formed on each side of each guide, and the monomode optical fiber portions separating the modulators being coupled to the ends of the guides.

6. A signal processing device according to claims 1 or 5, wherein, in order to provide the processing device with a wide band, control electrodes of said further phase modulators are in the form of matched lines.

7. A signal processing device according to claim 6, wherein the configurations of the electrodes and the direction of the applied voltage are defined so as to provide the desired weighting.

* * * * *